Jan. 12, 1965 V. GERARD 3,165,212
DEVICE FOR THE HANDLING OF FUEL CARTRIDGES
OF A NUCLEAR REACTOR
Filed Oct. 23, 1962 9 Sheets-Sheet 1

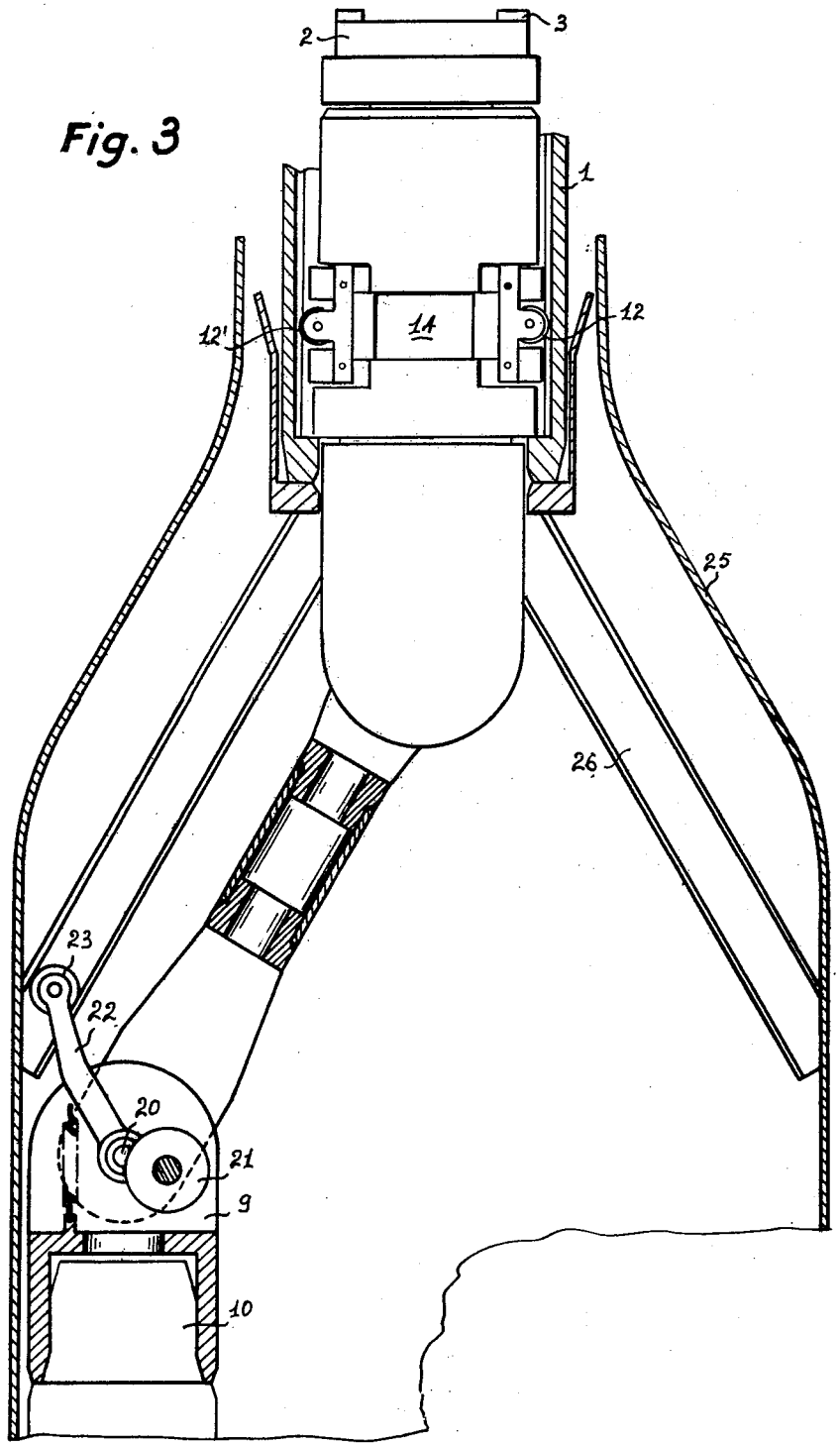

Jan. 12, 1965 V. GERARD 3,165,212
DEVICE FOR THE HANDLING OF FUEL CARTRIDGES
OF A NUCLEAR REACTOR
Filed Oct. 23, 1962 9 Sheets-Sheet 6

United States Patent Office 3,165,212
Patented Jan. 12, 1965

3,165,212
DEVICE FOR THE HANDLING OF FUEL CARTRIDGES OF A NUCLEAR REACTOR
Victor Gerard, Cachan, France, assignor to
L'Electricite de France (Service National)
Filed Oct. 23, 1962, Ser. No. 232,407
Claims priority, application France, Nov. 16, 1961,
879,186
7 Claims. (Cl. 214—27)

The present invention relates to a device for handling fuel elements of nuclear reactors, more particularly intended for nuclear reactors in which the fuel elements are stacked in vertical channels in the interior of a vessel.

Its object is to provide a handling device which permits discharging and charging of the fuel elements stacked in a certain number of channels through a single discharging orifice at a fairly high rate, due to the elimination of a certain number of operations, which are usually necessary, particularly the unloaded ascent of the gripper into the extraction machine.

The present invention has for its object to provide an improved fuel element handling device, in which the movement of a fuel element handling gripper is guided so as to permit the latter to proceed successively from an initial position to several adjacent channels without being raised in the extraction machine, it being possible to regulate the initial position again when the gripper has been fully raised.

This handling device is characterised in that it comprises a cylindrical sheath formed with internal grooves, a fork supporting the fuel element handling gripper and contained in said sheath, means for angularly positioning the folk before its descent into a discharging well, a guiding device for vertical and angular movement of the fork inside the sheath, said guiding device moving in said grooves of the sheath, a linkage system for connecting said device and fork, and a device for lateral movement of said fork towards and away from the channel to be processed.

The cylindrical sheath may comprise two groups of grooves symmetrical relative to a longitudinal axis, the vertical grooves of each group being connected together in pairs and spaced apart at a distance corresponding to that separating the channels to be processed, so that the passage of the guiding member from one to the other will cause the fork to turn through a corresponding angle.

During charging and discharging, the sheath is placed above an anti-escape tulip-type member fixed on the discharging well and serving to guide the lateral movement of the fork and gripper.

The invention is illustrated by way of example in the accompanying drawings, in which:

FIGS. 1 to 3 relate to a device for discharging and charging a well serving six channels surrounding a central storage channel.

FIG. 3 shows the device according to the invention in another position, the gripper being situated above the channel to be processed.

FIGS. 7 to 14 relate to a modified embodiment of the invention concerning a device adapted to discharge and charge a well serving eighteen channels surrounding a central channel intended for control rods.

Figures 7A, 7B:
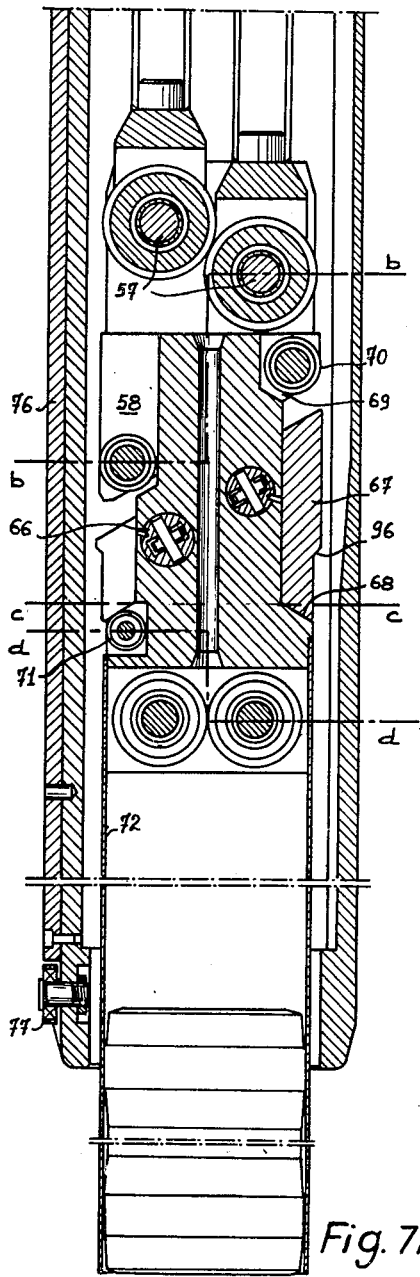

FIGS. 7a and 7b show the handling device in longitudinal section.

Figure 8:
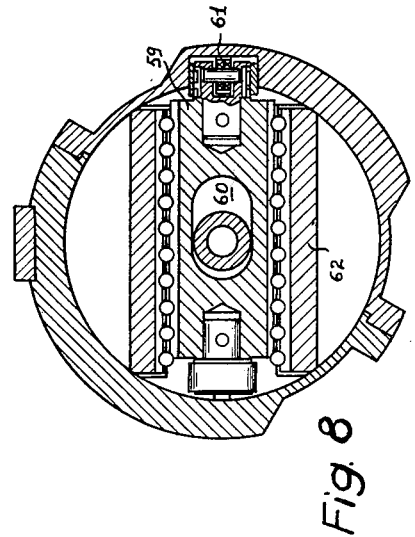
Figure 9:
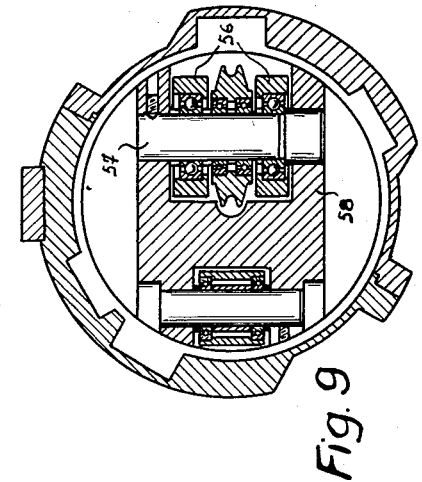
Figure 10:
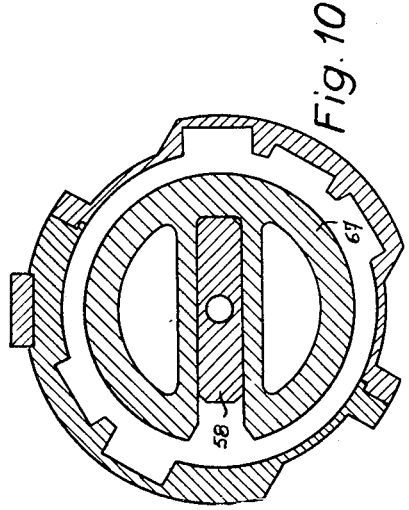
Figure 11:
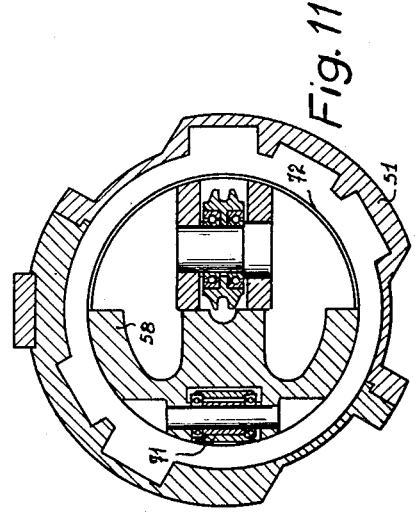
Figure 12:
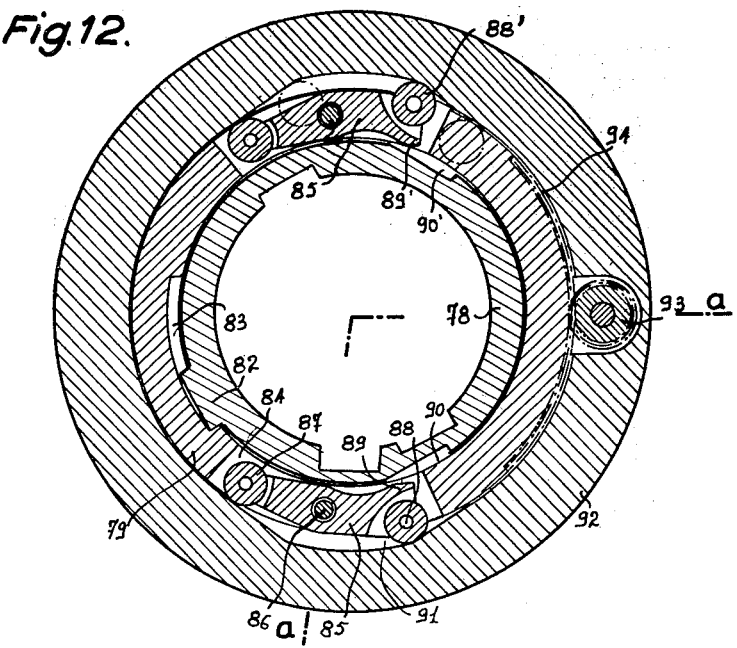
Figure 14:
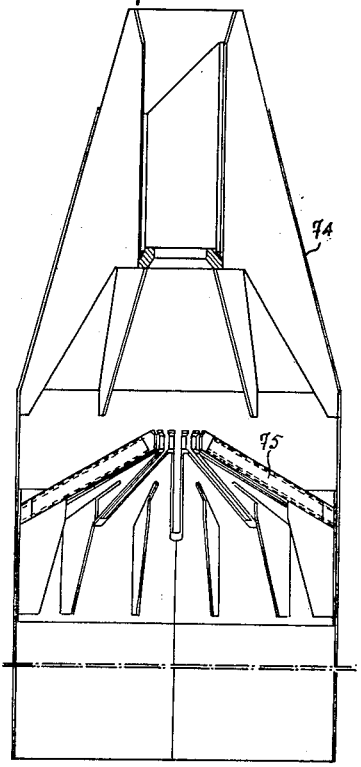
Figure 13:
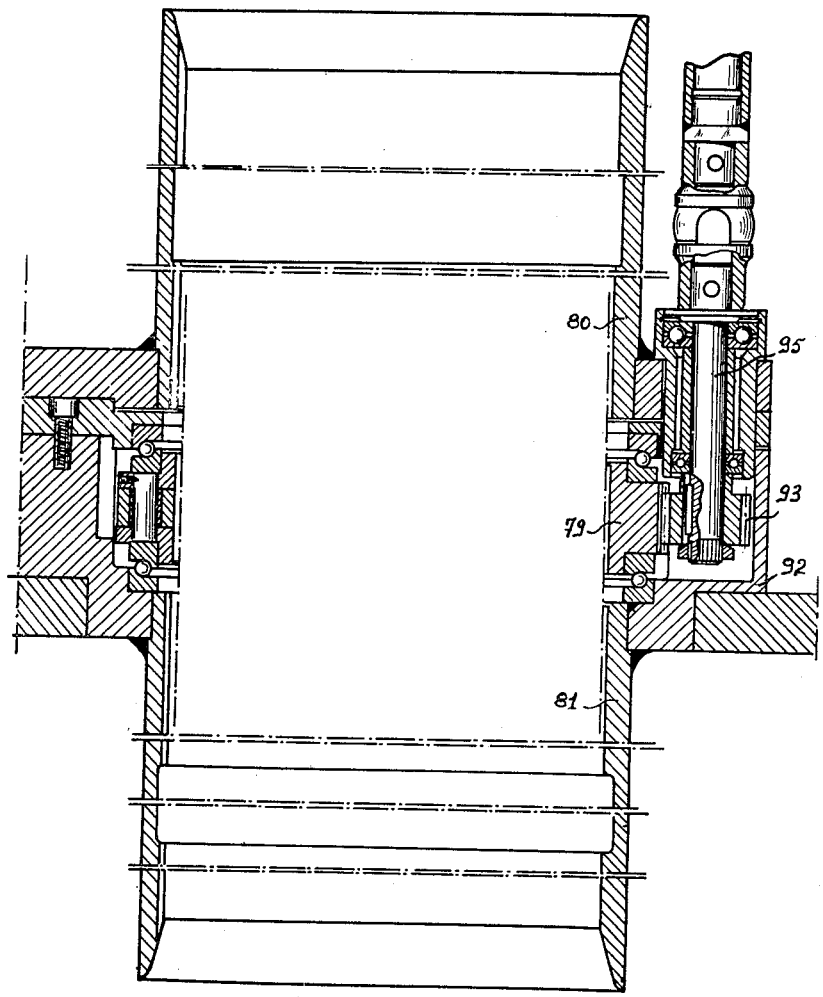

FIG. 8 is a sectional view on the line a—a of FIG. 7a.
FIG. 9 is a sectional view on the line b—b of FIG. 7b.
FIG. 10 is a sectional view on the line c—c of FIG. 7b.
FIG. 11 is a sectional view on the line d—d of FIG. 7b.
FIG. 12 is a sectional view of the stop ring control device.
FIG. 13 is a sectional view on the line a—a of FIG. 12.
FIG. 14 shows in section an anti-escape tulip-type member for a well with 18 channels.

Figures 1, 2:
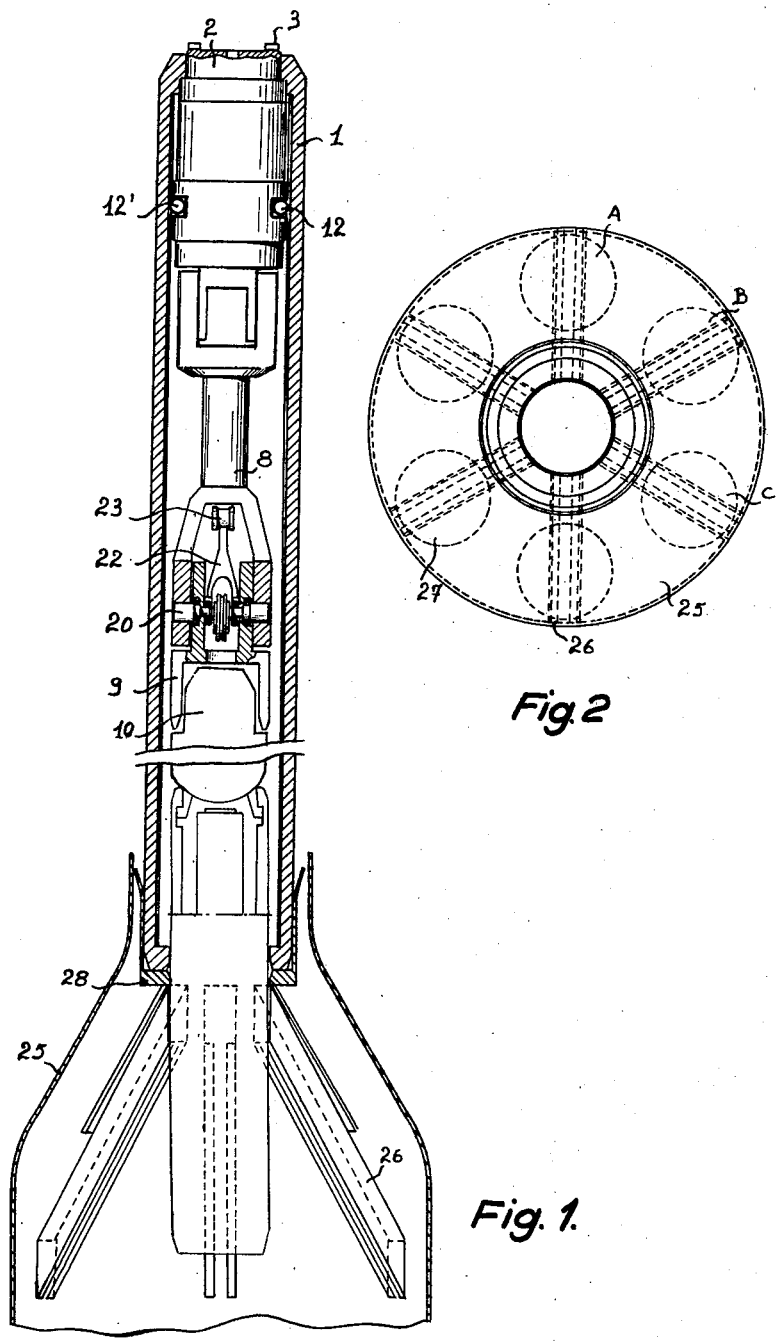
FIG. 1 shows the device according to the invention in a general view, partly broken away.
FIG. 2 is a view from above of the charging well with the fixed anti-escape tulip-type member.
Figure 1A:
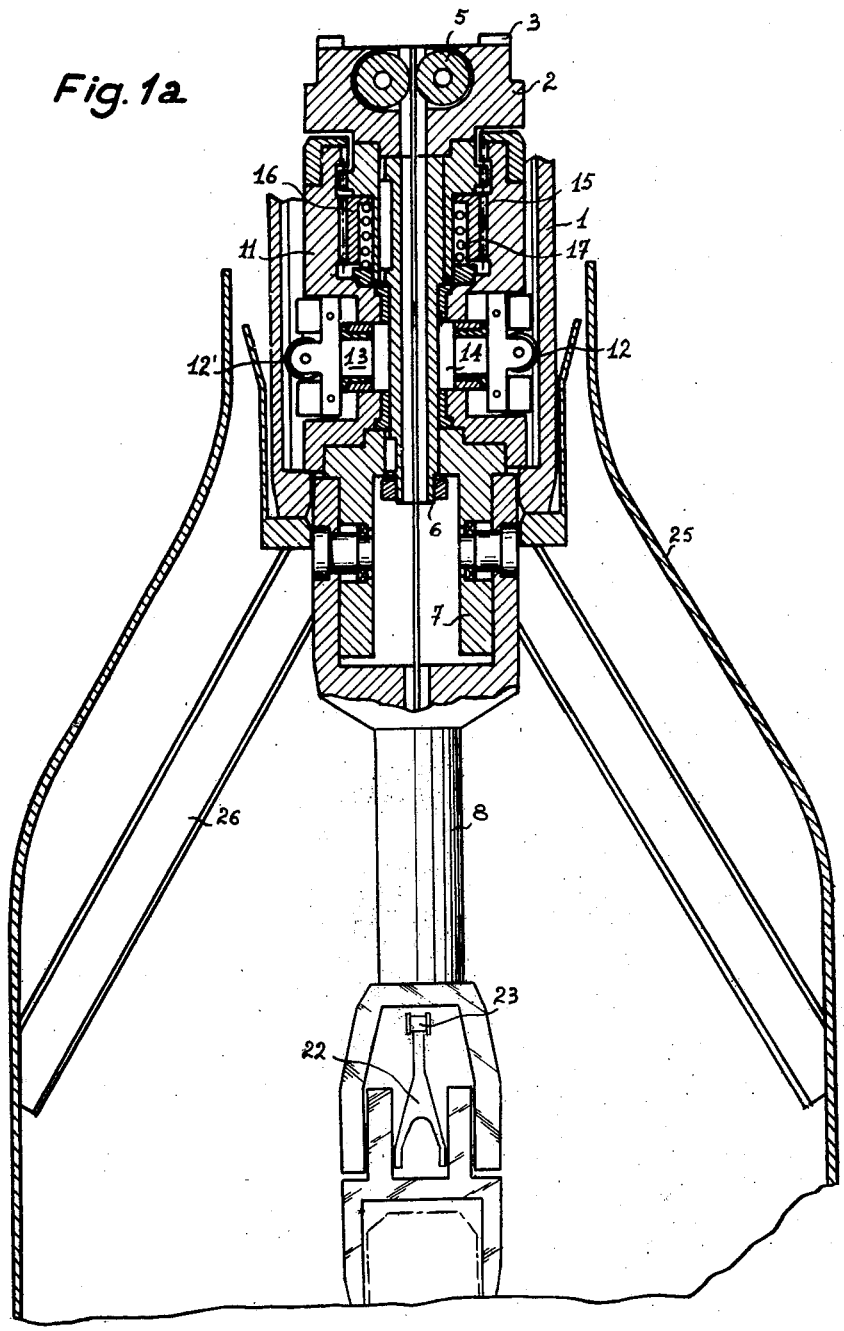
FIG. 1a shows the grab in the lowered position in part section on a larger scale.

The handling device shown in FIGS. 1 and 1a comprises a grab formed by a cylindrical sheath 1, in the upper part of which an "orienting" member 2 carries dogs 3 engaging dogs 28 of the driving device of the extraction machine. Said orienting member 2, bored axially in its centre, is provided with pulleys 5 for guiding the driving cable of the assembly. It is secured to a hollow shaft 6, which itself is fixed to a fork 7, to which is pivoted the end of an arm 8, the other end of which is pivoted to a fork 9 supporting a gripper 10.

The pin 20 pivoting the fork 9 to the arm 8 also supports a stirrup 22 supporting a guide roller 23, held in permanent contact with the sheath 1. A pulley 21 for guiding the driving cable is mounted between the two arms of the fork 9.

Mounted around the shaft 6, between the fork 7 and the orienting member 2 is a body 11 having a radial bore, in which is adapted to move perpendicularly to the shaft 6 a member 13 having at its centre an elongated aperture 14 through which passes the shaft 6. This member 13 carries at both ends rollers 12—12' in contact with the inner wall of the sheath 1.

The body 11 has formed in its upper part an internally toothed crown 15 meshing with a pinion 16 fixed to the shaft 6 and to the orienting member 2. A spring 17 secured at one end of the body 11 and at the other to the orienting member 2 keeps them slightly spaced apart so that the crown 15 and the pinion 16 are in engagement.

Figure 6:
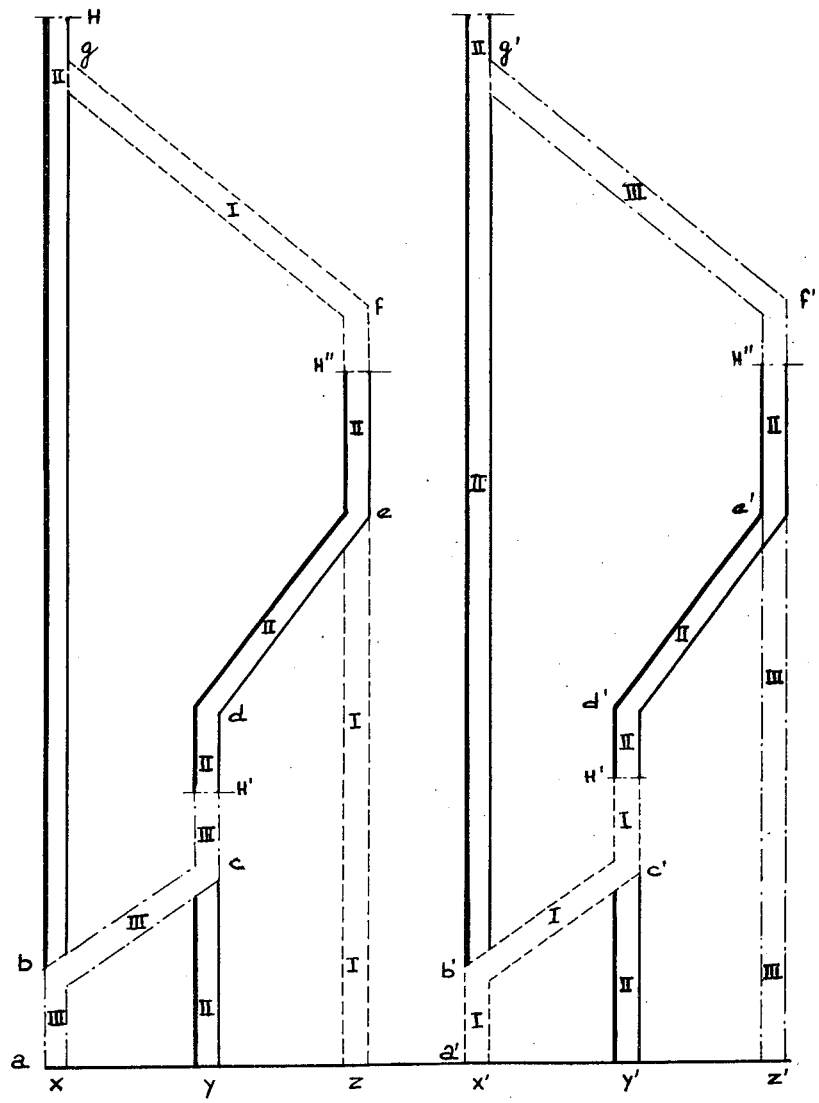
FIG. 6 shows the developments of the grooves machined in the inner surface of the sheath.

In the inner wall of the cylindrical sheath 1 are machined two groups of symmetrical grooves (FIG. 6), in each of which moves a roller 12—12' for guiding the movement of body 11.

Each group comprises three vertical grooves X–Y–Z and X'–Y'–Z' spaced on the wall of the sheath 1 by an arc corresponding to that separating two adjacent channels 27 of the discharging well. In the case of a well serving six peripheral channels and a central storage channel, these grooves will be separated by an arc of 30° and will correspond, for example, to two adjacent channels and the central channel.

The three vertical grooves X, Y and Z are unequal in height, Y is shorter than Z which is shorter than X. They are connected together by oblique grooves b–c connecting X to Y, $d$–$e$ connecting Y to Z and $f$–$g$ connecting Z to X, such that $b$ is lower than $c$, $d$ is lower than $e$ and $f$ is lower than $g$. Furthermore, the depth of the grooves is variable. They may have three different depths indicated by the references, I, II and III in FIG. 6, the reference I corresponding to zero depth and reference III to the greatest depth, while the intermediate depth is indicated by II.

The grooves X', Y', Z' and the grooves X, Y, Z are symmetrical relative to the axis of the sheath, but their depths are inverse.

Grooves X and X', for guiding the descent of the gripper, have a depth II from the top to the points $b$ and $b'$ where X becomes deeper (reference III), while the depth of X' becomes zero (reference I).

For guiding the ascent of the gripper, the roller 12 travels over the section $a$–$b$ of the groove X, then the change in depth obliges it to follow the oblique groove $b$–$c$ also of depth III. It then ascends the groove Y and can then either ascend only to the point H' and redescend the groove Y to permit the gripper to serve the corresponding channel, or ascend as far as $d$ and follow the oblique groove $d$–$e$. From this point $e$ it is in the groove Z and at the point H'', a similar alternative arises; descent of groove Z or ascent to the point $f$, then return to the groove X by the oblique groove $f$–$g$.

The roller 12' follows a corresponding path in the grooves X', Y' and Z'.

There is thus obtained a direct descent guided by the grooves X and X', while ascent always follows the paths $a$–$b$–$c$–$d$–$e$–$f$–$g$ and $a'$–$b'$–$c'$–$d'$–$e'$–$f'$–$g'$ with or without descent along the grooves Y and Y' or the grooves Z and Z'.

The grab is always used in connection with anti-escape devices constituted by tulip-type members placed above the discharging wells. The tulip-type members 25 are formed of a cylinder surmounted by a conical part, the upper part of which, of smaller diameter, forms a support for the grab. The tulip-type members 25 carry internally rails 26 as guides towards the different channels 27 of the well.

Figure 4:
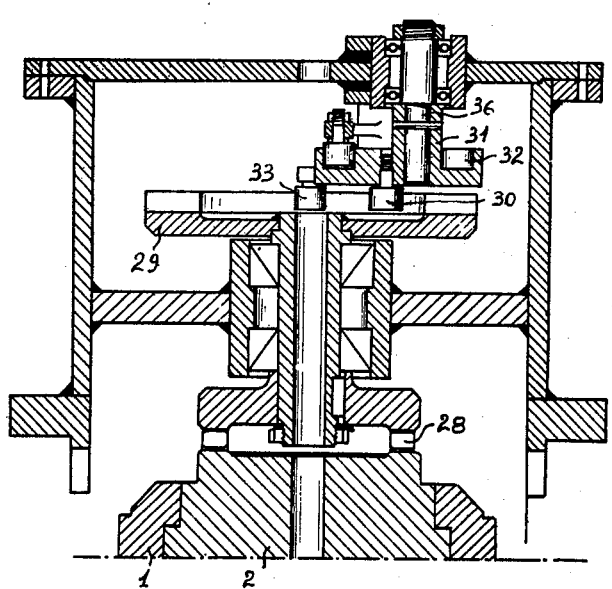
FIG. 4 is a section view of the device controlling the initial position of the gripper.
Figure 5:
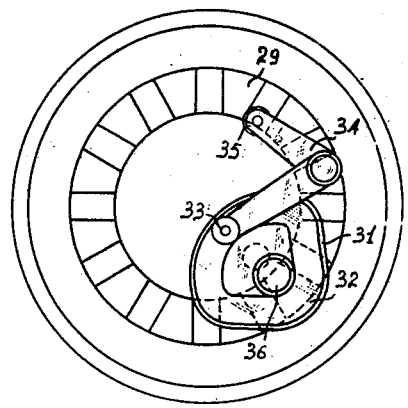
FIG. 5 is a view of said device from above.

When the grab is in the extraction machine (FIGS. 4 and 5), the dogs 3 of the orienting member 2 are in engagement with dogs 28 integral with the lower part of a maltese cross having twelve arms 29. Sliding in the grooves of this maltese cross 29 is a roller 30 carried by the lower face of a double cam 31, the upper face of which has a peripheral groove 32, in which moves a roller 33 mounted on the end of a bell-crank 34, the other end of which is provided with a finger 35 engaging one of the grooves of the cross 29.

The spindle 36 of the cam is connected to the principal driving device, not shown.

When the cam 31 starts its rotation, it moves the sliding roller 33 and expels the finger 35 from the groove in which it is situated; the maltese cross 29 is thereby liberated and is permitted to rotate in its turn. The cam 31 continues its rotation and the roller 30 passes from one groove to the next, so that when the cam 31 has turned through 360°, the maltese cross has rotated through 30° and consequently the dogs 28 and 3 and the orienting member 2 have rotated through the same angle. The gripper 10 is thus oriented in a definite direction.

Under the action of the operating winch, the cable driving the gripper unwinds and the grab leaves the extraction machine. The sheath 1 slides into the well and abuts against a shoulder 28 of the tulip-type member 25 which stops it. The cable continuing to unwind, all the sliding system, orienting member 2, pivoted arm 8 and gripper 10 descends in the sheath 1 guided by the movement of the rollers 12—12' in the grooves X and X' of said sheath.

The gripper 10 enters the tulip member 25 and the roller 23 enters the rail 26 corresponding to the orientation given to the gripper by the rotation of the maltese cross 29. The sliding of the roller 23 in the rail 26 leads the gripper opposite the channel A which is to be processed (FIG. 3), and the cable continuing to unwind, the said gripper descends in the heater of the reactor.

When the operation of the winch is reversed, the gripper ascends and abuts against the fork 9, then the sliding system commences to ascend. The roller 12 travels along the path $a$–$b$–$c$–$H'$, causing the gripper to rotate through an angle corresponding to the distance between the grooves X and Y, that is to say through an angle of 30°. A descent of the roller 12 along the groove Y from the point H' would bring the gripper into the central storage channel, the roller 23 sliding between two rails 26 of the tulip member 25. On ascending, the roller would again follow the groove Y to the point H'.

From this point H', under the action of the driving winch, the roller 12 ascends the groove $d$–$e$–$H''$, causing the gripper 10 to rotate again through an angle of 30° so as to put the roller 23 opposite a rail 26. The descent of the roller 12 along the groove Z would bring the gripper into channel B.

Another actuation of the winch causes the assembly to ascend and drives the roller 12 along the groove Z to the point $f$, then by the section $f$–$g$ brings it to the upper part of the groove X, causing the gripper to pivot through an angle of 60° for returning it to its starting position.

When the roller 12 arrives at the top of groove X, the orienting member 2 abuts against the upper part of the sheath 1 which it drives in its ascent. The entire grab is then returned into the extraction machine and the dogs 3 of the orienting member 2 come into engagement with the dogs 28 of the maltese cross 29. The spring 17 is then compressed and the toothed crown 15 and the body 11 and roller 12—12' are disengaged from the pinion 16.

A rotation of the maltese cross 29 produces rotation of the orienting member 2, fork 7, pivoted arm 8, gripper 10 and its guide roller 23, but the sheath 1 and rollers 12–12' remain stationary.

On re-descent of the assembly, roller 12 passes along the grooves X, Y, Z in the same way, but the guide roller 23 will lead the gripper towards the peripheral channels B–C and the central channel, for example.

It is thus possible to carry out simultaneous discharging and charging of two adjacnt channels, the half-used fuel elements being stored in the central channel for example.

This handling device may be used for charging and discharging of wells serving any number of channels, with or without a central storage channel.

FIGS. 7 to 14 represent a modified embodiment of such a device adapted to the charging and discharging of a well serving eighteen channels surrounding a channel intended for control rods.

It also comprises a grab constituted by a cylindrical sheath 51, in which slides an orienting member 52, probided with dogs 53 and secured to a hollow shaft 54. Pivoted to an arm 55 fixed to the hollow shaft 54 are two arms 56 carrying the gripper guide fork 58 by means of pivot pins 57.

Around the hollow shaft 54, a sliding member 59 having at its centre an aperture 60 carries guide rollers 61–61' sliding in the grooves X, Y, Z and X', Y', Z' of the sheath 51. The sliding member 59 moves radially in a body 62 fixed to an internally toothed crown 63 meshing with a pinion 64, secured to the orienting member 52. A spring 65 tends to move the orienting member 52 and body 62 apart for maintaining the crown 63 and pinion 64 in engagement.

The gripper guide fork 58 carries two guide rollers 66 rolling in the rails 75 of the tulip member around oblique axis. An orientation part 67, substantially U-shaped, is mounted around the fork 58 for sliding on the latter between two shoulders 68 and 69. Its upper part forms an inclined plane adapted to abut against bearing rollers 70 carried by the shoulder 69 also forming an inclined plane.

Above the shoulder 68, the fork has a recess in which is mounted a return roller 71 and gripper guide tube 72 which surrounds the assembly of gripper and fuel element.

In the case of charging a well serving eighteen channels distributed on two concentric circles, the grab is used with an anti-escape tulip member 74 (FIG. 14) provided with twelve guide rails 75, one rail in two permitting simultaneous service of an internal channel (six in number) and a peripheral channel.

The sheath 51 is provided with a longitudinal key 76, the ends of which are provided with bearing rollers 77, to facilitate its orientation relative to the well.

Two groups of three grooves X, Y, Z and X', Y', Z' (FIG. 6) are provided in the sheath 51 in the same way as in the sheath 1 of the grab for a well serving six channels. These grooves have an identical form and spacing, and rollers 61–61' run along them in the same way as the rollers 12–12' run along the sheath 1.

However, the sheath 51 comprises below the oblique groove b–c a rotating ring 78 (FIGS. 12 and 13), the inner face of which is provided with grooves corresponding to the grooves of the sheath 51, so that in one of the positions of this ring, the grooves are not interrupted and the rollers 61–61' can travel normally. Rotation of the ring 78 stops the grooves, which blocks the rollers 61–61' at a certain height, limits the travel of the rollers 66 in the rails and leads the gripper above one of the channels of the inner circle in which it descends.

This rotating ring 78 is placed in a cylindrical crown 79, mounted on ball bearings between two sleeves, an upper sleeve 80 and a lower sleeve 81, placed around the sheath 51. A guide rib 82 of the ring 78 is situated in a groove 83 of the crown 79. The later has two recesses 84, 84', in each of which a link 85, 85' carrying at each of its ends a roller 87–88 respectively pivots on a pin 86 fixed in its central part. To the end 89 carrying the roller 88 corresponding a recess 90 of the rotating ring 78. The rollers 87–88 run in recesses 91 of a housing 92 fixed to the lower and upper sleeves. The crown 79 comprises on its periphery a toothed sector 94 engaging a pinion 93 mounted in a recess of the housing 92 and driven from the exterior by a driving shaft 95.

A rotation of 30° of the crown 79 produces the displacement of the rollers 87–88 on the inclined plane formed by the recess 91, the end 89 of one of the links 85, for example, enters a recess 90 and pushes the ring 78 which in its rotation closes the grooves X, Y, Z. The ends 89 and 89' of the links 85 and 85' being at equal distances from the toothed sector 94 and being turned towards it, a reverse operation of the crown 79 causes the link 85' to act and pushes back the link 85, so that the ring 78 re-assumes its initial position.

In the discharging and charging of a well having eighteen channels surrounding a central channel intended for control rods, there are preferably provided one or two storage stations in the discharging machine itself. The grab has therefore to serve only two adjacent channels, either two inner channels or two outer channels, or an inner channel and an outer channel.

The starting position of the gripper is regulated by the rotation of the orienting member 52 driven, like the orienting member 2, by the cam 31 and by the maltese cross 29 carrying dogs 28.

For serving two of the six inner channels A and B for example, the rollers 66 do not have to travel over all the rails 75, consequently the roller 61 does not have to descend to the bottom of the groove X, Y or Z. The ring 78 is therefore rotated so as to close the lower part of the grooves. A descent of the roller 61 in the groove X serves the channel A, then an ascent by the path a–b–c–d–e to H'' permits it to be lowered in the groove Z spaced away from X by 60° for serving the channel B.

During the descent, the orientation part 67 abuts by a shoulder 96 against the rails of the tulip member. The cable continues to unwind, the fork 58 slides in the interior of the part 67 which comes into contact with the rollers 70. The latter run on the inclined plane formed by the orientation part 67 and the rails 75 and causes the rollers 66 to enter said rails, which direct the gripper guide fork 58 towards the position corresponding to the channel A. The cable continues to unwind, causing the gripper to enter said channel A.

Winding up of the cable returns the gripper 67 into the fork 58, then causes the rollers 66 to run in the rails, the return roller 71 running in the lower part of the said rails and preventing any ascent of the whole. When the fork 58 and the gripper guide tube 72 have returned to the axis of the sheath 51, the return roller 71 leaves the rails 75 and the grab may be drawn up.

Two of the twelve adjacent peripheral channels will be served in a similar manner, but the ring 78 will have to be turned to allow the roller 61 to pass freely to the bottom of the sheath 51. The guide rollers 66 will then slide to the end of the rail 75 to bring the gripper guide fork 58 above a peripheral channel.

During the re-winding of the cable, the roller 61 will ascend by the path a–b–c to the point H' of the groove Y, spaced away 30° from the groove X, down which the roller 61 has to descend for processing the second peripheral channel.

When it is desired to process simultaneously an inner channel and a peripheral channel, it is only necessary to regulate the position of the ring 78 before operating the winch. As one rail 75 in two processes two channels, an inner one and the other peripheral, the passage from one to the other simply requires the ascent of the gripper in the fork 58, rotation of the ring 78 and re-descent of the roller 61 in the groove X, resulting in the displacement of the whole on the rails 75.

It is thus possible to carry out discharging and charging of the eighteen channels of the same well while serving several adjacent channels simultaneously, which eliminates a certain number of operations and above all unloaded ascents in the machine.

Two embodiments of the handling device according to the invention, adapted for discharging and charging a well serving six or eighteen channels have been described, but it is quite obvious that a grab could be used for charging well serving any number of channels, the distance between the grooves being capable of variation, as well as the angle of rotation of the orienting member.

Likewise, reference has only been made to fuel elements, but it is quite evident that this device is also intended for handling any other like elements, such as yokes and reflectors.

What is claimed is:

1. A device for handling fuel elements of nuclear reactors in vertical channels of the reactors comprising a cylindrical sheath formed with internal grooves, a fork supporting a fuel element handling gripper mounted in said sheath, means for angularly positioning said fork before its descent into a discharging well, a guiding device for vertical and angular movement of said fork inside said sheath, said guiding device moving in said grooves of said sheath, means for connecting said device and said fork and means for guiding the lateral movement of said fork with respect to the channel to be processed.

2. A device as described in claim 1 including two groups of said grooves within said sheath, each of said groups being symmetrical relative to the longitudinal axis of said sheath and vertical grooves in each of said groups connected in pairs and spaced apart at a distance corresponding to the distance which separates the channels to be processed.

3. A device as described in claim 2, said grooves having a depth varying by stages for determining the path to be travelled by said guiding device.

4. A device as described in claim 1, said guiding device including rollers mounted in a member transversely mounted in said sheath, said rollers being mounted in two symmetrical grooves of said grooves.

5. A device as described in claim 1, said guiding means including at least one guide roller for said fork for lateral displacement of said fork at the exit of said sheath, an anti-escape tulip member fixed to the discharging well and rails in said member, said guide roller engaging one of said rails.

6. A device as described in claim 4 including an orienting member, a shaft connecting said orienting member and said fork, said shaft passing with play through said member for said rollers.

7. A device as described in claim 6, said shaft being hollow and including a pivoted arm connecting said orienting member to said fork.

References Cited by the Examiner
UNITED STATES PATENTS

| 2,825,599 | 3/58 | Dent | 294—86 |
| 3,130,841 | 4/64 | Trickett | 176—30 X |

FOREIGN PATENTS

| 1,226,658 | 7/60 | France. |
| 1,230,566 | 9/60 | France. |

CARL D. QUARFORTH, *Primary Examiner.*